US010946345B2

(12) United States Patent
Schuster et al.

(10) Patent No.: US 10,946,345 B2
(45) Date of Patent: Mar. 16, 2021

(54) MICROPOROUS POLYVINYLIDENE FLUORIDE MEMBRANE

(71) Applicant: MEMBRANA GMBH, Wuppertal (DE)

(72) Inventors: Oliver Schuster, Gevelsberg (DE); Quan Huang, Schwelm (DE); Ngoc-Phung Duong, Essen (DE); Karl Bauer, Dammbach (DE); Wolfgang Ansorge, Essen (DE)

(73) Assignee: EM Innovative Properties Company, St. Paul, MN (US)

( * ) Notice: Subject to any disclaimer, the term of this patent is extended or adjusted under 35 U.S.C. 154(b) by 643 days.

(21) Appl. No.: 14/893,274

(22) PCT Filed: May 22, 2014

(86) PCT No.: PCT/EP2014/060527
§ 371 (c)(1),
(2) Date: Nov. 23, 2015

(87) PCT Pub. No.: WO2014/191296
PCT Pub. Date: Dec. 4, 2014

(65) Prior Publication Data
US 2016/0089638 A1 Mar. 31, 2016

(30) Foreign Application Priority Data

May 29, 2013 (EP) .................................... 13169698

(51) Int. Cl.
B01D 71/34 (2006.01)
B01D 69/02 (2006.01)
(Continued)

(52) U.S. Cl.
CPC .......... B01D 71/34 (2013.01); B01D 61/364 (2013.01); B01D 67/0018 (2013.01);
(Continued)

(58) Field of Classification Search
None
See application file for complete search history.

(56) References Cited

U.S. PATENT DOCUMENTS 4,399,035 A * 8/1983 Nohmi ................ B01D 61/145
210/500.23
4,594,207 A * 6/1986 Josefiak .............. B01D 67/003
210/500.23
(Continued)

FOREIGN PATENT DOCUMENTS

DE 28 33 493 2/1980
DE 33 29 578 3/1985
(Continued)

OTHER PUBLICATIONS

Sina Bonyadi & Tai-Shung Chung, Highly porous and macrovoid-free PVDF hollow fiber membranes for membrane distillation by a solvent-dope solution co-extrusion approach, 331 J. Membrane Sci. 66, 66-74 (2009) (Year: 2009).*
(Continued)

Primary Examiner — Krishnan S Menon
Assistant Examiner — Brad Gordon
(74) Attorney, Agent, or Firm — Scott A. Baum

(57) ABSTRACT

Hydrophobic hollow-fiber membrane made from a vinylidene fluoride polymer with a wall and a wall thickness, an outer surface on its outer side, an inner surface on its inner side and facing its lumen and adjacent to the inner surface a supporting layer having a structure that is substantially isotropic across the wall thickness, the supporting layer extending over at least 80% of the wall thickness and comprising pores having an average diameter of less than 1 μm, and wherein the hollow-fiber membrane has pores on its outer surface and on its inner surface, characterized in that the vinylidene fluoride polymer has a weight-average molecular weight $M_W$ in the range from 550 000 to 700 000

(Continued)

Figure 7:
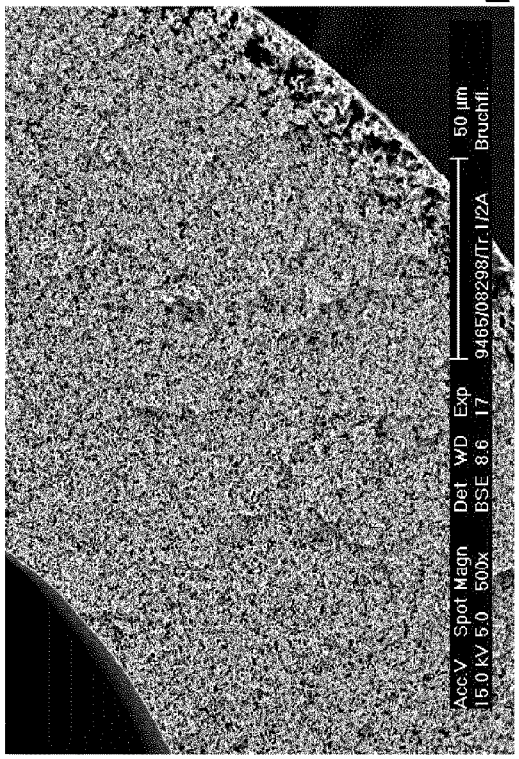

daltons and a polydispersivity greater than 3.0; the pores in the outer and in the inner surface are formed like islands and have a maximum ratio of their longitudinal extension to the transverse extension of 10; the porosity lies in the range from 50 to 90 vol. %, the wall thickness in the range from 50 to 300 µm, and the diameter of the lumen in the range from 100 to 500 µm; and the hollow-fiber membrane has a maximum separating pore diameter $d_{max}$ in the range from 0.3 to 0.7 µm, determined according to the bubble point method.

6 Claims, 3 Drawing Sheets

(51) Int. Cl.
| | | |
|---|---|---|
| B01D 69/08 | (2006.01) | |
| B01D 71/76 | (2006.01) | |
| B01D 71/32 | (2006.01) | |
| B01D 61/36 | (2006.01) | |
| B01D 67/00 | (2006.01) | |

(52) U.S. Cl.
CPC ........... *B01D 69/02* (2013.01); *B01D 69/081* (2013.01); *B01D 69/087* (2013.01); *B01D 71/76* (2013.01); *B01D 71/32* (2013.01); *B01D 2325/026* (2013.01); *B01D 2325/04* (2013.01); *B01D 2325/24* (2013.01); *B01D 2325/38* (2013.01)

(56) References Cited

U.S. PATENT DOCUMENTS

| | | | | |
|---|---|---|---|---|
| 4,666,607 | A * | 5/1987 | Josefiak | B01D 63/061 |
| | | | | 210/640 |
| 5,013,339 | A | 5/1991 | Mahoney | |
| 6,146,747 | A | 11/2000 | Wang | |
| 6,497,752 | B1 | 12/2002 | Kessler | |
| 2002/0011443 | A1 * | 1/2002 | Komatsu | B01D 69/08 |
| | | | | 210/650 |
| 2003/0094409 | A1 | 5/2003 | Minegishi | |
| 2004/0135274 | A1 | 7/2004 | Matsuda | |
| 2005/0058821 | A1 | 3/2005 | Smith | |
| 2006/0144788 | A1 * | 7/2006 | Cath | B01D 61/364 |
| | | | | 210/640 |
| 2006/0178480 | A1 * | 8/2006 | Tada | B01D 67/003 |
| | | | | 525/199 |
| 2008/0210624 | A1 | 9/2008 | Li | |
| 2009/0110900 | A1 * | 4/2009 | Yokota | B01D 71/68 |
| | | | | 428/221 |
| 2009/0283469 | A1 | 11/2009 | Ariji | |
| 2011/0031100 | A1 * | 2/2011 | Qtaishat | B01D 71/54 |
| | | | | 202/205 |
| 2011/0239865 | A1 * | 10/2011 | Huang | B01D 69/08 |
| | | | | 96/6 |
| 2013/0255498 | A1 * | 10/2013 | Shibata | B01D 71/26 |
| | | | | 96/10 |

FOREIGN PATENT DOCUMENTS

| | | | |
|---|---|---|---|
| DE | 36 17 724 | 12/1987 | |
| EP | 0 133 882 | 3/1985 | |
| EP | 0 734 759 | 2/1996 | |
| EP | 1 230 970 | 8/2002 | |
| EP | 1 520 874 | 4/2005 | |
| EP | 1 913 992 | 4/2008 | |
| EP | 1 932 582 | 6/2008 | |
| GB | 1 576 228 | 10/1980 | |
| WO | WO 1993/22034 | 11/1993 | |
| WO | WO-2012043613 A1 * | 4/2012 | ............ B01D 61/02 |

OTHER PUBLICATIONS

May May Teoh & Tai-Shung Chung, Membrane Distillation with hydrophobic macrovoid-free PVDF-PTFE hollow fiber membranes, 66 Sep. Purif. Technol. 229, 229-236 (2000). (Year: 2009).*

El-Bourawi et al.: "A framework for better understanding membrane distillation separation process", *J. of Membrane Science*, vol. 285 (2006) pp. 4-29.

Kesting: "Synthetic Polymeric Membranes: A Structural Perspective", John Wiley & Sons, 1985, $2^{nd}$ ed., pp. 261-264.

Khayet et al., "Preparation and characterization of polyvinylidene fluoride hollow fiber membanes for ultrafiltration", Polymer, vol. 43 (2002) pp. 3879-3890.

Smolders, et al., "Liquid-liquid phase separation in concentrated solutions of non-crystallizable polymers by spinodal decomposition", *Kolloid-Z. u. Z. Polymere*, vol. 243 (1971), pp. 14-20.

Solef & Hylar PVDF "Polyvinylidene fluoride Design and Processing Guide" (Jul. 27, 2009) XP055453863, retrieved from Internet: URL:https://www.equflox.com/sites/default/files/bijlagen/bestanden/solef_hylar_2009.pdf.

Wenten, et al., The Bubble Gas Transport Method, *Membrane Characterization*, http://dx/doi.org/10.1016/B978-0-444-63776-5. 00011-5, (2017) pp. 199-217.

* cited by examiner

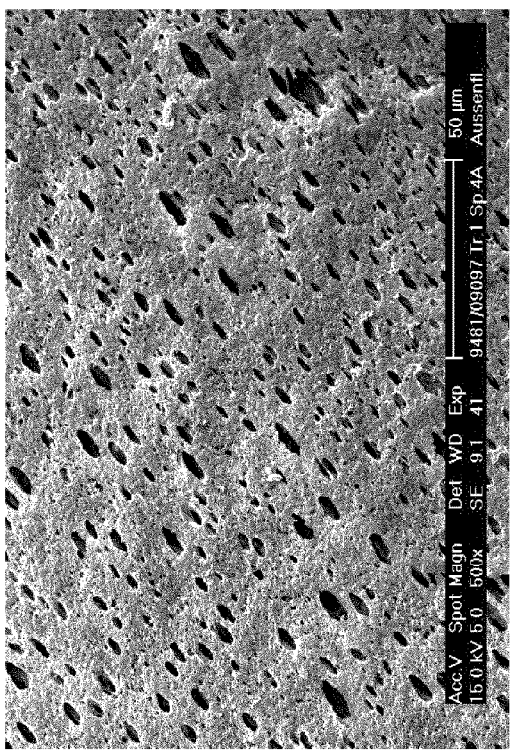
Fig. 3
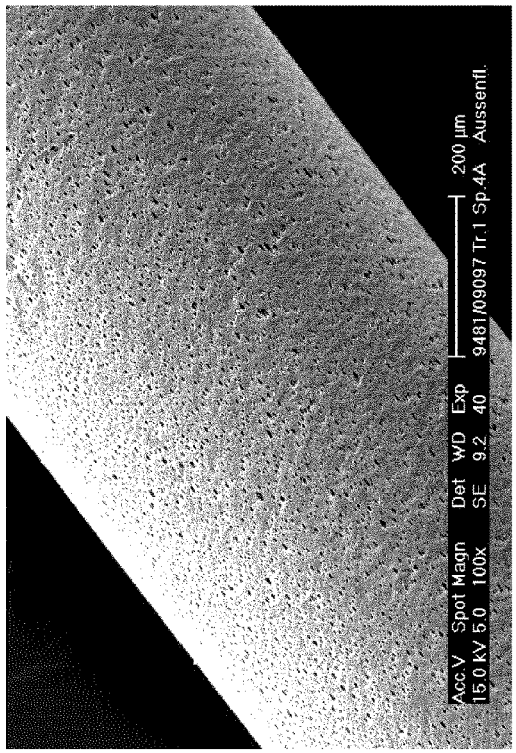
Fig. 1
Fig. 4
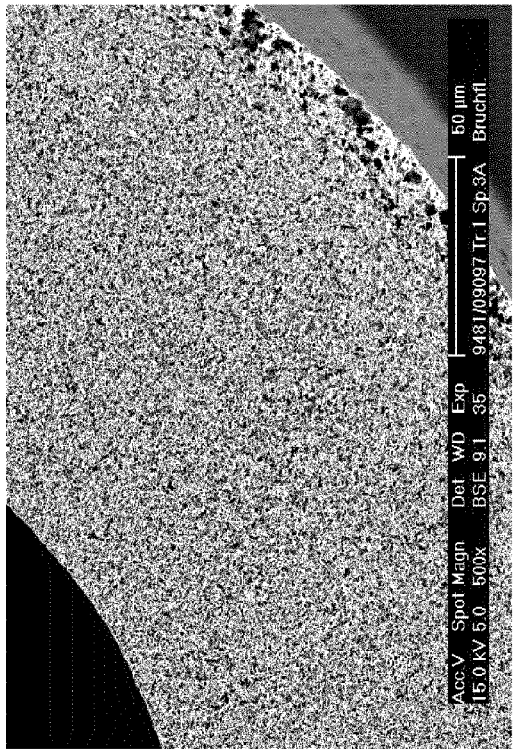
Fig. 2

MICROPOROUS POLYVINYLIDENE FLUORIDE MEMBRANE

CROSS REFERENCE TO RELATED APPLICATIONS

This application is a national stage filing under 35 U.S.C. 371 of PCT/EP2014/060527, filed 22 May 2014, which claims priority to EP Patent Application No. 13169698.1, filed May 29, 2013, the disclosures of which are incorporated by reference in their entirety herein.

The invention relates to a hydrophobic hollow-fiber membrane with a microporous structure made from a vinylidene fluoride polymer with a wall, an outer surface on its outer side, an inner surface on its inner side, and a wall thickness, and a lumen enclosed by the inner side, wherein the wall of the hollow-fiber membrane comprises a microporous supporting layer having a sponge-like, open-pored pore structure that is substantially isotropic across the wall thickness and without finger pores, and wherein the supporting layer extends over at least 80% of the wall thickness and comprises pores having an average diameter of less than 1 µm, and wherein the hollow-fiber membrane has pores in its outer surface and in its inner surface.

Microporous polymer membranes are used in the most varied industrial, pharmaceutical, and medical applications for precise filtration. In these applications, membrane separation processes are becoming increasingly important, since these processes offer the advantage that the materials to be separated are not thermally stressed and certainly not damaged. Microfiltration membranes enable for example the removal of fine particles or microorganisms having sizes down to the submicron range, and are therefore suitable for the production of purified water for use in laboratories or for the semiconductor industry. Numerous other applications of membrane separation processes are known from the beverage industry, biotechnology, or from wastewater technology.

Membranes are also increasingly used for membrane distillation. Membrane distillation is a combination of conventional thermal distillation and membrane filtration. The process is a thermally driven separation method in which the separation—as with conventional distillation—takes place due to a phase change. For example, when treating salt water by means of membrane distillation, a hydrophobic membrane is used that forms a barrier for the liquid phase, that is, for the salt water. For the vapor phase, i.e. for water vapor, however, the membrane is pervious and water vapor can permeate through the pores of the membrane. The driving force for the process is a partial vapor pressure gradient that is usually produced by a temperature difference on the two sides of the membrane. As a rule, the salt water to be treated is heated and guided along one side of the hydrophobic membrane. The other side of the membrane is kept at a lower temperature level to realize the required temperature difference. The process can be performed in such a way that results in condensation on the permeate side of the membrane of the water molecules permeating through the membrane. However, the process can also be performed in such a way that the permeating water molecules are transported away in the form of vapor and condensed in a separate condenser.

The selective property of a membrane that is used for membrane distillation (MD) is therefore based on the retention of liquid water with simultaneous permeability for free water molecules, i.e. for water vapor. In the application it is important that the water to be treated does not permeate the membrane at all or only to an insignificant extent and fill the pores. To prevent the passage of the water to be treated through the membrane and permit only the passage of water vapor or water molecules, it is necessary for the pores of the membrane to remain filled with air. In this case, the hydrostatic pressure on the side of the membrane on which the water to be treated is located must be lower than the permeation pressure, that is, the pressure at which permeation of the water through the membrane begins to take place.

In this case, membranes used in the field of membrane distillation are manufactured from a hydrophobic polymer, such as polytetrafluoroethylene (PTFE), polyvinylidene fluoride (PVDF), or polypropylene (PP). Membrane polymers of this type are simultaneously distinguished by high temperature stability and good chemical resistance, which is required inter alia for the cleaning of these membranes with acids and lyes. At the same time, the membranes must have a high pressure stability for membrane distillation.

U.S. Pat. No. 6,146,747 relates to PVDF membranes that are hydrophilic due to the addition of a hydrophilic polymer, such as polyvinylpyrrolidone in particular. In one embodiment, the membranes of U.S. Pat. No. 6,146,747 have an isotropic structure extending across at least 80% of the wall thickness. The hollow-fiber membranes disclosed in U.S. Pat. No. 6,146,747 have smaller pores on their outer side than on their inner side. The isotropic area on the inside has relatively large pores with pores in the range of 10 µm and has a filament-like network structure. The production of the membrane takes place from solutions conditioned to a temperature slightly above room temperature, wherein the coagulation is triggered by submersion in a non-solvent that is not capable of dissolving the PVDF. The process is therefore based on non-solvent-induced phase separation.

EP-0 734 759 B1 discloses membranes made from PVDF that are manufactured using a membrane formation process with a thermally induced liquid-liquid phase separation. The membranes show a fiber-like structure with fiber- or filament-like strands that are connected at multiple positions separated from each other along their longitudinal extension. In the case that the membranes of EP-0 734 759 B1 are hollow-fiber membranes, the strands are oriented in the axial direction. During the production of these hollow-fiber membranes, a suitable membrane-forming PVDF solution is extruded through the inner annular gap of a hollow-fiber die with three annular gaps and a central opening. Simultaneously with the membrane-forming PVDF solution, a fluid forming the lumen is extruded through the central opening on the hollow-fiber die, a coating liquid extruded through the center annular gap, and a cooling medium extruded through the outer annual gap. The membranes of EP-0 734 759 B1 allow the passage of water and, according to the examples, have water permeabilities up to 300 ml/(min·m²·bar). A disadvantage of membranes of this type is that, due to the structure of fiber- or filament-like strands, the spaces between the filament-like strands and therefore the size of the pores can change under pressure.

EP-A-1 520 874 relates to membranes inter alia made from polyvinylidene fluoride, the wall of which consists of a network-like structure in combination with a structure formed by spherical or nearly spherical particles that are arranged in layers. The objective of EP-A-1 520 874 is to provide membranes that allow the passage of water, i.e. with a high permeability for water. The membranes of EP-A-1 520 874 can also be manufactured in a thermally induced phase separation process.

EP-A-1 913 992 describes hollow-fiber membranes suitable for the treatment of water and made from PVDF, which, after wetting treatment, have a high permeability for water and an average pore size in the range from 0.05 to 0.2 µm. The method according to EP-A-1 913 992 for producing hollow-fiber membranes comprises the melt extrusion of a composition of the PVDF polymer, a plasticizer, and a high amount of a good solvent for PVDF, the cooling and solidification of the composition to form a hollow fiber in a cooling liquid, as well as the extraction of the plasticizer to obtain the hollow-fiber membrane. As a good solvent for PVDF, solvents such as N-methyl pyrrolidone, dimethylformamide, or dimethyl sulfoxide, etc. are used. Gases or inert liquids are used as a cooling medium. After extraction of the plasticizer, the obtained membranes are drawn. Similar membranes are attained according to EP-A-1 932 582, during the production of which the method step of drawing is followed by a two-stage relaxation step.

U.S. Pat. No. 5,013,339 discloses PVDF membranes that, depending on the manufacturing method, are intended for use in microfiltration, ultrafiltration, membrane distillation, or dialysis and can have an isotropic or anisotropic structure over the membrane cross-section. The method for manufacturing these membranes is also based on a thermally induced phase separation process wherein a glyceryl monoacetate, glyceryl diacetate, or glyceryl triacetate, or mixtures thereof, can be used as the solvent system, to which glycerol can be added if necessary. Cooling and coagulation take place in a non-solvent for the polyvinylidene fluoride, which is preferably water. The PVDF membranes disclosed in DE-A-3329578 are produced in a similar process, wherein the coolant in the method described runs through a spinning tube.

US-A-2005/0058821 describes the manufacture of PVDF membranes by means of a thermally induced phase separation process from solutions of polyvinylidene fluoride in glyceryl triacetate. The PVDF membranes arising in the process have a structure formed by aggregations of particles connected by fibrils, or by aggregations of spherulites. Although US-A-2005/0058821 mentions that hollow-fiber membranes can also be produced according to the process disclosed therein, the statements in this document, and in particular the examples, refer solely to flat sheet membranes.

US-A-2004/0135274 relates to membranes made from vinylidene fluoride homopolymers or copolymers and likewise produced via a method with thermally induced phase separation. The membranes from US-A-2004/0135274 have an isotropic network structure with three-dimensional branchings in random spatial directions, and the targeted membranes are those which have porous surfaces. The membranes of US-A-2004/0135274 are used for filtration, such as to separate particles from liquids, and have a high permeability for water. An embodiment of the membranes from US-A-2004/0135274 concerns hollow-fiber membranes, during the production of which it is advantageous that they be cooled by direct contact with a liquid cooling medium. In cases in which the cooling medium has a low affinity for vinylidene fluoride homopolymers or copolymers, as is the case for example with water, ethylene glycol, or decalin, the surface of the resulting membrane has a skin-like structure or a structure consisting of a particulate material. With high solvent affinity for the vinylidene fluoride homopolymer or copolymer, according to the statements of US-A-2004/0135274, open-pored surfaces are obtained. With the method of US-A-2004/0135274, solidification of the polymer phase takes place by means of crystallization.

Hollow-fiber membranes made from vinylidene fluoride homopolymers or copolymers are also the subject of US-A-2009/0283469. The membranes of US-A-2009/0283469 are produced using a method with thermally induced phase separation, in which latent solvents, and preferably water-soluble latent solvents, are used as a solvent system, wherein the latent solvents do not dissolve the polymer at room temperature but at higher temperatures. The hollow-fiber membranes of US-A-2009/0283469 have a thick outer layer and below the thick outer layer a homogeneous supporting layer with a coarser structure. The transition from the outer layer to the supporting layer is essentially discontinuous.

In applications of membranes in membrane distillation, the pore tortuosity or tortuosity of the membranes is an important characteristic of the membranes for the permeation of the water vapor molecules through the membrane wall, as described in M. S. El-Bourawi et al.: "A framework for better understanding membrane distillation separation process", J. of Membrane Science 285 (2006) 3-29, Elsevier. Generally, the membrane pores do not go straight through the membrane wall, and the molecules diffusing through the membrane must diffuse through the membrane wall along tortuous paths. The longer these tortuous paths, the lower the transmembrane flows through the membrane. The tortuosity specifies the average path lengths of the pores with respect to the membrane thickness.

The object of the invention is to provide a membrane suitable for membrane distillation that can be used for membrane distillation tasks in aqueous media, has a high permeability for water vapor, but does not allow the permeation of water when applying high water pressures.

The object according to the invention is achieved by a hydrophobic hollow-fiber membrane made from a vinylidene fluoride polymer, wherein the hollow-fiber membrane has a wall with a wall thickness, an outer surface on its outer side, and an inner surface on its inner side and facing its lumen, wherein the hollow-fiber membrane has a continuous skin on its inner and on its outer surface, wherein pores are formed in the skin of the inner surface and in the skin of the outer surface, and wherein the hollow-fiber membrane, adjacent to the inner surface, has a supporting layer having a microporous, sponge-like, open-pored structure that is substantially isotropic across the wall thickness, the supporting layer extending over at least 80% of the wall thickness and comprising pores having an average diameter of less than 1 µm, characterized in that the vinylidene fluoride polymer forming the structure of the hollow-fiber membrane has a weight-average molecular weight $M_W$ in the range from 550 000 to 700 000 daltons and a polydispersivity, given by the ratio of the weight-average $M_W$ and the number average $M_N$ of the molecular weight, that is greater than 3.0, the pores in the skin of the outer surface and the pores in the skin of the inner surface are formed like islands, i.e. have a closed perimeter in the plane of the skin, and the pores in the skin of the outer and of the inner surface have a ratio of their longitudinal extension in the direction of the longitudinal axis of the hollow-fiber membrane to their transverse extension in the circumferential direction of the hollow-fiber membrane of a maximum of 10, the porosity of the hollow-fiber membrane lies in the range from 50 to 90 vol. %, the wall thickness in the range from 50 to 300 µm, and the diameter of the lumen in the range from 100 to 500 µm, and the hollow-fiber membrane has a maximum separating pore diameter $d_{max}$ in the range from 0.3 to 0.7 µm, determined according to the bubble point method.

Due to the combination according to the invention of the structural characteristics including in particular the pore size and pore structure across the wall thickness, the open-pored structure of the surfaces, the porosity, and the membrane dimensions, high mass flows for water vapor are achieved without a breakthrough of water through the membrane.

As previously stated, the hollow-fiber membrane has a continuous skin on its outer surface and on its inner surface. Pores are formed in the skin of the inner surface and in the skin of the outer surface and therefore in the inner and the outer surface. According to the invention, the pores in the outer surface and the pores in the inner surface have a closed perimeter in the plane of the respective skin. This means that the pores are formed like islands in the surrounding skin, i.e. in an island shape and surrounded by the respective skin. The pores or openings in the surfaces of the present membrane and the skin surrounding them have an island-sea structure, wherein the pores ("islands") are arranged as a discontinuous phase in the skin surrounding them, which represents a continuous phase ("sea") with regions and webs surrounding the pores or openings, which regions and webs lie on the respective surface in one plane.

Due to the island-shaped formation of the pores in the inner and outer surface with a closed perimeter in the plane of the respective skin, the inventive hollow-fiber membranes differ from hollow-fiber membranes that have a network-like structure on their surfaces, such as those that the membranes of US-A-2004/0135274 have, or a network-like structure in the form of oriented branchings, as are disclosed for the membranes of EP-A-0 734 759. On the other hand, the structure of the surfaces of the present membranes differs from particulate or spherulitic structures, in which the polymer structure of the membrane is formed by spherical or spherulitic particles, which can be connected to each other via fibril-like webs. Membranes with surface structures of this type are shown in WO-A-93/22034 for example. It was found that a comparatively smooth surface structure of the present membrane is favorable in application with respect to a low degree of fouling or with respect to a reduction or avoidance of the lodging of particles.

The special structure of the inventive hollow-fiber membrane, in particular its microporous supporting layer with a sponge-like, open-pored pore structure that is isotropic across the wall thickness, the supporting layer extending over at least 80% of the wall thickness and the pores of which having an average diameter of less than 1 µm, is the basis of the high strength and good mechanical properties of the membranes in application. Due to this structure, the membranes of the invention differ from membranes having an asymmetric structure in which the pore size changes even within the supporting layer, from membranes that have cavern-like pores in the walls thereof, and also from membranes whose surfaces and/or supporting structure have a particulate or spherulitic structure. These membranes from the prior art often have insufficient mechanical properties, such as insufficient breaking strength and elongation at break, due to their different structure.

The homogeneous, isotropic structure of the supporting layer of the hollow-fiber membranes according to the invention effects a uniform distribution of the loads across the membrane wall during mechanical stress, which distribution leads to high pressure stabilities, high breaking strengths, and high elongations at rupture. With regard to the mechanical properties, it is simultaneously important that the size of the pores in the supporting layer remains in the stated range. In particular, the supporting structure is to have no finger pores, which are also often designated as caverns or macrovoids and can have a size of several µm. Finger pores of this type show a disadvantageous wetting behavior that results in an early penetration of water into the pores. Instead, the inventive membranes have pores with an average diameter of less than 1 µm, such that the supporting layer is thus relatively finely pored. Preferably, the average diameter of the pores in the supporting layer is less than 0.5 µm.

The pore structure in the supporting layer is substantially isotropic according to the invention. By this it is understood on the one hand that the average diameter of the pores in the supporting layer is substantially constant when viewed across the wall thickness using a scanning electron microscopic examination at 2000× magnification. Expressed another way, the region of the isotropic support structure can be viewed as a region in which flow channels with substantially constant diameters are present across the wall thickness. Naturally, the fact that the actual size of the pores in the isotropic supporting layer varies somewhat should also be taken into account, i.e. the supporting layer has, to a certain extent, a pore size distribution as is applicable for every membrane structure, even if the structure appears isotropic in the scanning electron microscopic examination. Within the context of the present invention, therefore, a substantially constant average pore diameter is understood as one that does not change by more than +/−50% in the extension of the supporting layer across the membrane wall.

On the other hand, a substantially isotropic pore structure is simultaneously to be understood such that even if the individual pores can also have an irregular or oblong form, when averaged over all the pores, the pores in the spatial directions transverse to the longitudinal direction of the hollow-fiber membranes have substantially the same extension, whereby deviations among the extensions in the individual spatial directions of up to 20% are included. The membranes of the invention thereby have a cell-like structure, which exhibits pores surrounded by pore walls, the pores having in part spherical and ellipsoidal shapes and connected to each other via openings in their walls. The present structure thus differs for example from network structures having randomly oriented three-dimensional branchings in the spatial directions, such as the microporous membranes from US-A-2004/0135274 or EP-A-0 734 759, to which explicit reference is made at this point regarding this disclosure. On the other hand, the pore structure of the membranes of the present invention differs from particulate or spherulitic structures, in which the polymer structure of the membrane is formed by spherical or spherulitic particles, which can be connected to each other via fibril-like webs. Membranes with structures of this type are described, for example, in EP-A-1 230 970 or WO-A-93/22034 or disclosed in US-A-2004/0135274 in FIG. 6, to which explicit reference is made at this point regarding this disclosure. Likewise, the structure of the membrane according to the invention is different from the fiber-like structures with fiber- or filament-like strands, such as those of the membranes of EP-0 734 759 B1, to which explicit reference is made at this point regarding this disclosure.

The homogeneous, isotropic structure of the supporting layer with a microporous pore structure, the pores thereof having an average diameter of less than 1 µm, in conjunction with porous inner and outer surfaces, is decisive for sufficiently high permeabilities for gaseous media such as water vapor in application of the membrane of the invention in membrane distillation. Preferably, the inventive hollow-fiber membrane has a mass flow for water vapor, or a transmembrane flow for water vapor, of at least 35 l/(m²·h), determined by means of a module of the hollow-fiber membrane with a membrane area of 40 cm² at a salt water circuit temperature of 80° C. and a distillate circuit temperature of 30° C., a volume flow in the circuits of 200 l/h, a pressure level in the circuits of 500 mbar at the inlet to the hollow-fiber membrane module, and a salt concentration in the salt circuit of 36 g/l.

To realize high transmembrane flows for water vapor, it is advantageous if a high partial vapor pressure gradient across the membrane wall exists in the application for membrane distillation. Due to the balanced combination with regard to its structural characteristics, the hollow-fiber membrane according to the invention has a high mechanical strength and is therefore capable of withstanding the differential pressures occurring in application, in which a vacuum often exists on the permeate side. In a preferred embodiment, the hollow-fiber membrane has an elongation at break of at least 50%. In a further preferred embodiment, it has a breaking strength of at least 400 cN/mm². Especially preferably, it has an elongation at break of at least 50% in conjunction with a breaking strength of at least 400 cN/mm².

It has been demonstrated that the polyvinylidene fluoride used has a decisive effect on the mechanical properties and on the performance data of the membrane. It was found that for membranes in which a polyvinylidene fluoride with an insufficient molecular weight, i.e. with a weight-average molecular weight in the range below $M_W$=550 000 daltons was used, the elongation at break and therefore the strength of the membranes obtained thereby were insufficient. It was also shown that in membranes made from a polyvinylidene fluoride with a weight-average molecular weight in the range from 550 000 to 700 000 daltons but a polydispersivity below 3, a change in the pore structure can be observed in which the pores are connected to each other to a lesser extent, that is they exhibit a lower interconnectivity. As a result, the obtained transmembrane flows for isopropyl alcohol decrease and in particular the tortuosity increases. Preferably, the structure of the vinylidene fluoride polymer forming the hollow-fiber membrane has a polydispersivity that is greater than 4. The polydispersivity is preferably a maximum of 7. It was observed that in membranes made from a polyvinylidene fluoride with a weight-average molecular weight in the range from 550 000 to 700 000 daltons, but with a polydispersivity that is greater than 7, the obtained membrane structures can deviate from the membrane desired according to the invention.

To furthermore withstand pressures occurring in application on the sides of the hollow-fiber membrane without water permeating the membrane wall, the hollow-fiber membrane of the invention has a maximum separating pore diameter $d_{max}$ in the range from 0.3 to 0.7 µm, determined according to the bubble point method. With maximum separating pore diameters above 0.7 µm, an increasing risk exists that, at the operating pressures prevailing in the application as well as their fluctuations and taking into account the temperature effects, water enters and permeates the membrane. Maximum separating pore diameters under 0.3 µm increasingly effect a decrease in the achievable transmembrane flows for water vapor. Preferably, the hollow-fiber membrane of the invention therefore has a maximum separating pore diameter $d_{max}$ in the range from 0.4 to 0.55 µm, determined according to the bubble point method.

The hollow-fiber membrane according to the invention has a porosity in the range from 50 to 90 vol. %. Below 50 vol. %, the application in membrane distillation shows a significant decrease in the achievable transmembrane flows for water vapor. Over 90 vol. % on the other hand, it has been shown that the mechanical properties of the hollow-fiber membrane decrease. It is advantageous if the porosity of the hollow-fiber membrane lies in the range from 70 to 85 vol. %.

Achieving high transmembrane flows for water vapor also requires the membrane wall to have a high overall permeation capacity for media. Particularly decisive for this are porosity, pore structure, pore size, the distribution and permeability of the pores in the wall, as well as the surface porosity. The transmembrane flow for isopropyl alcohol is considered the measure of high permeability for hydrophobic membranes. As previously stated, the present hollow-fiber membrane has a high permeability and in a preferred embodiment has a transmembrane flow for isopropyl alcohol in the range from 2 to 8 ml/(cm²·min·bar) and particularly preferably a transmembrane flow for isopropyl alcohol in the range from 3 to 6 ml/(cm²·min·bar).

According to the invention, the hollow-fiber membrane has a wall thickness in the range from 50 to 300 µm. By also maintaining the further structure properties required according to the invention on the one hand, the desired high transmembrane flows for water vapor can thereby be realized. On the other hand, the hollow-fiber membranes have a sufficiently high mechanical strength. In addition, heat losses via the membrane wall that result in a loss in efficiency in applications in membrane distillation are kept sufficiently low. Preferred is a wall thickness in the range from 100 to 200 µm and particularly preferred in the range from 125 to 175 µm. It is likewise advantageous if the diameter of the lumen of the hollow-fiber membrane lies in the range from 200 to 450 µm and particularly advantageous if the diameter lies in the range from 290 to 370 µm.

In a preferred embodiment, the pores in the inner surface of the hollow-fiber membrane have a maximum diameter of 3 µm. With such a pore diameter on the inner surface, when a flow is applied in membrane distillation applications on the lumen side, a significantly decreased risk of water entry into the membrane is found. In this case, the diameter of the pores with a non-circular shape is to be understood as the length of the shorter main axis of the pore. Particularly preferably, the pores in the inner surface of the hollow-fiber membrane have a maximum diameter of 2 µm.

In a preferred embodiment, the pores in the inner surface are smaller than the pores in the outer surface. In particular in applications in membrane distillation, in which the outer surface of the hollow-fiber membrane is the permeate side, in which a gaseous phase is present on the permeate side of the membrane, and in which in particular a vacuum exists on the permeate side as well, it has been found that larger pores in the outer surface are advantageous for transporting the permeate away from the membrane.

As is evident based on scanning electron microscope (SEM) images, for example at 500 to 2000× magnification, the present hollow-fiber membrane in a likewise preferred embodiment has pores in the outer surface that are larger than the pores in the area of the supporting layer with an isotropic pore structure. The pores in the isotropic area of the supporting layer therefore have a smaller average diameter than the pores in the outer surface and the skin of the outer surface. The outer skin is therefore more coarsely pored than the supporting layer in its isotropic area.

It has proven to be advantageous with respect to the temperature stability of the membrane, i.e. in particular with respect to any shrinking of the membrane at higher temperatures associated with a change in the pore structure, if the membrane has not been subjected to significant drawing during its production. A high degree of drawing affects the pores on the surfaces, which in the direction of extension of the hollow-fiber membrane have a significantly greater diameter than e.g. in the circumferential direction. The pores in the outer and/or inner surface of the hollow-fiber membrane therefore have a ratio of their longest axis to their shortest axis of at most 10 and preferably of at most 5.

The inventive hollow-fiber membrane can be produced by a method in which the membrane formation takes place via a thermally induced phase separation process.

A further object is therefore achieved by a method for producing a hydrophobic hollow-fiber membrane of this type made from a vinylidene homopolymer or copolymer, wherein the method comprises at least the following steps:
- a) Preparing a homogeneous spinning solution of 20-40 wt. % of a polymer component made from at least one vinylidene fluoride polymer in 80-60 wt. % of a solvent system, wherein the spinning solution of the polymer component and solvent system has on cooling a critical demixing temperature and a solidification temperature, and a miscibility gap to below the critical demixing temperature in the liquid state of aggregation, and wherein the solvent system contains a compound A and a compound B, which are liquid and can be mixed homogeneously with each other at the dissolving temperature, and wherein a solvent for the polymer component is selected for compound A and compound B is a non-solvent for the polymer component,
- b) Shaping the spinning solution into a hollow-fiber with an outer surface on its outer side and an inner surface on its inner side in a hollow-fiber die which has a die temperature above the critical demixing temperature,
- c) Cooling the hollow fiber by means of a cooling medium, which is conditioned to a cooling temperature below the solidification temperature, at such a rate that a thermodynamic non-equilibrium liquid-liquid phase separation into a polymer-rich and a polymer-poor phase takes place, and subsequently, on passing below the solidification temperature, solidification of the polymer-rich phase takes place,
- d) Removing the solvent system from the hollow fiber, if necessary, wherein the method is characterized in that the polymer component has a weight-average molecular weight $M_W$ in the range from 550 000 to 700 000 daltons and a polydispersivity, given by the ratio of the weight-average $M_W$ and the number average $M_N$ of the molecular weight, that is greater than 3.0, and for cooling, the outer surface of the hollow fiber is brought into contact with a liquid cooling medium that does not react chemically with the polymer component and contains a solvent and a non-solvent for the polymer component.

Surprisingly, it has been found that by maintaining these process conditions, the hollow-fiber membrane according to the invention made from a vinylidene fluoride homopolymer or copolymer with a microporous, sponge-like, and open-pored structure can be obtained, which adjacent to the skin of the inner surface thereof has a supporting layer with an essentially isotropic pore structure across the wall thickness, the supporting layer extending over at least 80% of the wall thickness and having pores with an average diameter of less than 1 µm, and has a continuous skin on the inner and outer surfaces thereof in which island-shaped pores are formed and have a closed perimeter in the plane of the skin. It has been shown here that in particular the selection of the vinylidene fluoride homopolymer or copolymer with regard to the molecular weight as well as to the polydispersivity and the selection of the cooling medium has an effect on the formation of the membrane structure.

The method according to the invention is based on a thermally induced phase separation process with liquid-liquid phase separation. According to the invention, the polymer component and the solvent system containing the compounds A and B form a binary system which in the liquid state of aggregation has a range in which the complete system is present as a homogeneous solution, and a range in which it has a miscibility gap. If a system of this type is cooled from the range in which it is present as a homogeneous solution to below the critical demixing or phase separation temperature, then initially a liquid-liquid demixing or phase separation into two liquid phases takes place, namely into a polymer-rich phase and a polymer-poor phase. During further cooling to below the solidification temperature, the polymer-rich phase solidifies into the three-dimensional membrane structure. Within the context of the present invention, the solidification temperature of the system made from the polymer component and compounds A and B lies preferably above 50° C. and particularly preferably above 100° C. If the cooling rate is sufficiently high that the liquid-liquid phase separation cannot take place under thermodynamic equilibrium conditions but instead takes place under thermodynamic non-equilibrium conditions, yet on the other hand if the cooling rate is still relatively slow enough, the liquid-liquid phase separation takes place approximately simultaneously with the formation of a large number of liquid droplets of essentially the same size. The resulting polymer structure then has a sponge-like, cellular, and open-pored microstructure. The different types of formation of such sponge-like, microporous structures using processes with thermally induced liquid-liquid phase separation are extensively described in DE-A 27 37 745, to which explicit reference is made regarding this disclosure, and presented e.g. in R. E. Kesting: "Synthetic Polymeric Membranes", John Wiley & Sons, 1985, pp. 261-264.

The vinylidene fluoride polymer forming the hollow-fiber membrane of the invention or used in the production method thereof to form the membrane can be a vinylidene fluoride homopolymer or a vinylidene fluoride copolymer. Copolymers of vinylidene fluoride with at least one further component, selected from the group of vinyl fluorides, ethylene tetrafluorides, propylene hexafluorides, ethylene trifluorides, ethylene trifluoride chlorides, vinyl fluoride, and ethylene are possible vinylidene fluoride copolymers. Preferably, mixtures of two or more vinylidene fluoride homopolymers and/or copolymers can be used. Within the context of the present invention, vinylidene fluoride homopolymers are preferred.

According to the invention, the employed polymer component made from at least one vinylidene fluoride homopolymer or copolymer has an average molecular weight $M_W$ in the range from 550 000 to 750 000 daltons, measured using gel permeation chromatography, and a polydispersivity of at least 3. In the case of the preferred use of mixtures of two or more vinylidene fluoride homopolymer and/or copolymer components, the components can preferably have different average molecular weights, such that by setting the mixture the weight-average molecular weight and the polydispersivity can be adjusted.

As previously stated, the polyvinylidene fluoride used and in particular its molecular weight and the polydispersivity of its molecular weight have a decisive effect on the mechanical properties and the performance data of the membrane, but also on the pore structure, which forms during production of the hollow-fiber membranes. It has been found that using a polyvinylidene fluoride polymer component with a weight-average molecular weight in the range from 550 000 to 700 000 daltons, but a polydispersivity below 3 results in membranes in which the pores exhibit a lower interconnectivity and an increased tortuosity. Preferably, the polyvinylidene fluoride polymer component used has a polydispersivity that is greater than 4. The polydispersivity is preferably a maximum of 7. During production of membranes from a polyvinylidene fluoride component with a weight-average molecular weight in the range from 550 000 to 700 000 daltons, however with a polydispersivity greater than 7, it has been observed that the then present very different molecule chain lengths of the vinylidene fluoride polymer molecules in the present method with thermally induced phase separation can result in very different precipitation kinetics and, for example, precipitation at very different temperatures. This can have an effect on the forming membrane structures and can prevent the desired membrane structures from being obtained.

In so far as it is necessary, the vinylidene fluoride homopolymers or vinylidene fluoride copolymers can also contain additives such as antioxidants, UV absorbers, lubricants, or nucleating agents.

The employed compositions of the polymer component, compound A, and compound B, wherein compounds A and B together form the solvent system, must be jointly convertible into a single, homogeneous liquid phase and have a critical demixing temperature, below which a phase separation into two liquid phases occurs. This temperature, however, is higher than the demixing temperature of a solution that contains equal proportions of polymer, yet only contains compound A as the solvent system. For systems of polymer component/compound A with a miscibility gap in the liquid state of aggregation, the critical demixing temperature is thus raised by the addition of compound B. The addition of compound B enables a targeted control of the pore size and the pore volume in the porous structures obtained.

Compounds of a type are to be used for compound A that are solvents for the polymer component and in which this polymer component is dissolved completely to form a homogeneous solution during heating to at most the boiling point of this compound. According to the invention, a compound is selected as compound B which is a non-solvent for the polymer component. A non-solvent for the polymer component is generally understood within the context of the present invention to be a compound which does not dissolve the polymer component, at a concentration of 1 wt. % in the non-solvent, to form a homogeneous solution during heating to at most the boiling point of this non-solvent.

Compound A can thereby have been mixed with further solvents. Compound B can also be used in a mixture with additional non-solvents. As a result, in the context of the present invention, compound A is understood as not only a single compound but also as a mixture of different solvents, as long as the overall effect as a solvent remains unchanged. Likewise, compound B is also understood as a mixture of different non-solvents, as long as the effect as a non-solvent remains unchanged.

As compound A, i.e. as the solvent for the at least one vinylidene fluoride homopolymer or copolymer, preferably glyceryl triacetate, glyceryl diacetate, 2-(2-butoxyethoxy-)ethyl acetate, dibutyl phthalate, adipic acid diethyl ester, adipic acid dibutyl ether, butyl diglycol acetate, butyl glycol acetate, glycol diacetate, propylene carbonate, butyrolactone, or c-caprolactam, or mixtures of the compounds mentioned are used. Particularly preferably, glyceryl triacetate or a mixture of glyceryl triacetate and c-caprolactam is used for compound A. As compound B, i.e. as the non-solvent for the polymer component, dioctyl adipate, glyceryl monoacetate, glycerol, glycol, diglycol, or castor oil, or mixtures thereof are well suited. Particularly preferred is the use of dioctyl adipate or castor oil or mixtures thereof.

The proportion of polymer required for the production of the membrane as well as the ratio of compound A to compound B in the solvent system can be determined by the generation of phase diagrams by means of simple tests. Phase diagrams of this type can be developed according to known methods, as described e.g. by C. A. Smolders, J. J. van Aartsen, A. Steenbergen, "Kolloid-Z. and Z. Polymere", 243 (1971), pp. 14-20. As a rule, for a predetermined solvent A, the proportion of compound B in the mixture of the polymer component, compound A, and compound B is dependent on the strength of the non-solvent, i.e. of compound B. The proportion of compound B in the solvent system is preferably 30 to 70 wt. %.

According to the invention, the concentration of the at least one vinylidene fluoride homopolymer or copolymer in the homogeneous solution lies between 20-40 wt. % and the concentration of the solvent system between 80-60 wt. %. In a preferred embodiment of the method according to the invention, the proportion of the polymer component is 20-30 wt. % and the proportion of the solvent system, consisting of compounds A and B, is 80-70 wt. %. If necessary, additional substances can be added to the polymer component, compounds A and B, or also the polymer solution, such as antioxidants, nucleating agents, extenders, components for improving biocompatibility i.e. the blood compatibility during use of the membrane in oxygenation, e.g. vitamin E, and the like.

To form the hollow-fiber membranes, the polymer solution is extruded through the annular gap of a hollow-fiber die and the hollow fiber is formed. A fluid is metered through the central bore of the hollow-fiber die, the fluid functioning as the inner filling by means of which the lumen of the hollow fiber or the hollow-fiber membrane is formed and stabilized. The extruded hollow fiber or the resulting hollow-fiber membrane then has a surface facing the lumen, which is the inner surface, and a surface facing away from the lumen, separated from the inner surface by the wall of the hollow fiber or hollow-fiber membrane, which is the outer surface.

Liquids such as glycerol or also a gas such as nitrogen or air are possibilities for the inner filling. Preferably nitrogen is used as the inner filling.

After formation in the hollow-fiber die, the outer surface of the hollow fiber is brought into contact with a liquid cooling medium that does not react chemically with the polymer component and that contains a solvent and a non-solvent for the polymer component. To achieve an open outer surface, i.e. an outer surface having a high number of pores, it is advantageous if the cooling medium as such acts as a solvent for the polymer component at the die temperature. Naturally, the cooling medium must act as a non-solvent for the polymer component at the cooling temperature.

Preferably, the solvent and/or the non-solvent contained in the cooling medium are compound A and compound B, respectively, which are also used to produce the homogeneous solution of the polymer component and solvent system. By this means, a mass transfer between the hollow fiber extruded from the hollow-fiber die and the cooling medium can occur, which is especially conducive to the formation of the membrane structure according to the invention and especially for the formation of the structure of the outer surface of the membrane. Particularly open outer surfaces are obtained if the concentration of compound A in the cooling medium is higher than in the spinning solution. Naturally, the condition must still be fulfilled that the cooling medium acts as a non-solvent for the polymer component at the cooling temperature.

It is particularly advantageous if compound B, or the non-solvent contained in the cooling medium, is a strong non-solvent for the polymer component, whereby the condition for a strong non-solvent applies such that the demixing temperature of a system which consists of 30 wt. % of the polymer component, 40 wt. % of compound A used as a solvent, and 30 wt. % of compound B, or the non-solvent contained in the cooling medium, lies, in relation to the solidification temperature, at least 25% above the solidification temperature of this system. To introduce a thermodynamic non-equilibrium liquid-liquid phase separation, the temperature of the cooling medium must lie significantly below the critical demixing temperature or phase separation temperature of the polymer solution used and additionally below the solidification temperature in order to solidify the polymer-rich phase. Preferably, the cooling medium has a temperature that lies at least 100° C. below the phase separation temperature, and particularly preferably a temperature that lies at least 150° C. below the phase separation temperature. It is particularly advantageous thereby if the temperature of the cooling medium is lower than 50° C. In individual cases, cooling to temperatures below room temperature can be required.

After exiting the hollow-fiber die, the hollow fiber can be fed for cooling through a shaft or spinning tube in which the cooling medium is located. In so doing, the cooling medium and the hollow fiber are generally fed in the same direction through the shaft or spinning tube. Preferably, the hollow fiber and cooling medium traverse the shaft or spinning tube in the same direction, wherein the average linear speed of the cooling medium is at least 20% and particularly preferably at least 40% lower than the drawing off speed of the formed hollow fiber through the shaft or spinning tube. The average linear speed of the cooling medium is hereby understood as the volume flow of the cooling medium through the shaft or the spinning tube in relation to the cross-section of the shaft or the spinning tube. Method variations of this type are described for example in DE-A-28 33 493 or EP-A-133 882.

Following cooling and solidification of the polymer structure and thereby the membrane structure, compounds A and B are generally removed from the shaped body. The removal can take place for example through extraction. Preferably extracting agents of a type are used thereby that do not dissolve the polymer or polymers but can be mixed with compounds A and B. Subsequently, drying at increased temperatures can be necessary in order to remove the extracting agents from the membrane. Usable extracting agents are acetone, methanol, ethanol, and preferably isopropyl alcohol.

The invention is to be explained in more detail on the basis of the following examples and figures. The content of the figures is as follows:

FIG. 1: Scanning electron microscopic (SEM) image of a cross section of the membrane according to Example 1 at 500× magnification.

FIG. 2: SEM image of a portion of the cross section of the membrane according to Example 1 at 2000× magnification.

FIG. 3: SEM image of the outer surface of the membrane according to Example 1 at 100× magnification.

FIG. 4: SEM image of the outer surface of the membrane according to Example 1 at 500× magnification.

Figure 5:
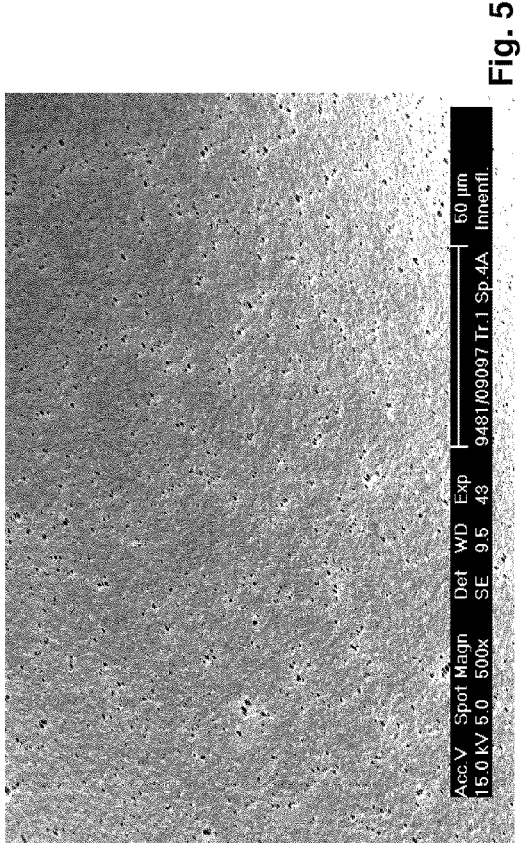

FIG. 5: SEM image of the inner surface of the membrane according to Example 1 at 500× magnification.

Figure 6:
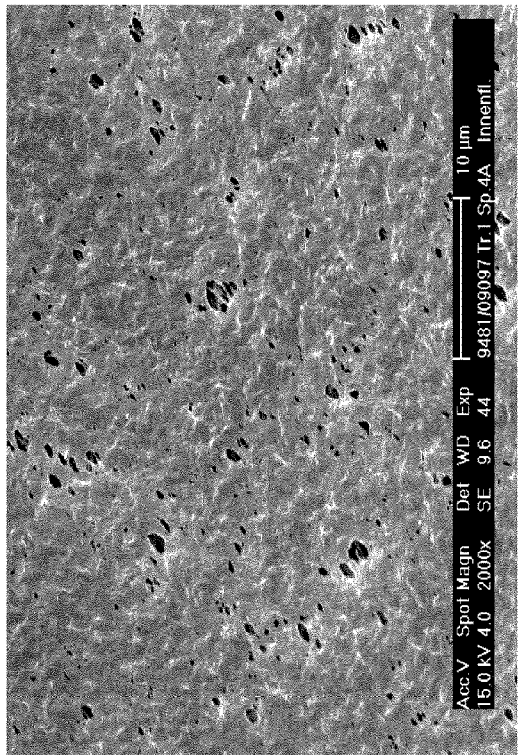

FIG. 6: SEM image of the inner surface of the membrane according to Example 1 at 2000× magnification.

FIG. 7: SEM image of a cross section of the membrane according to Example 2 at 500× magnification.

Figure 8:
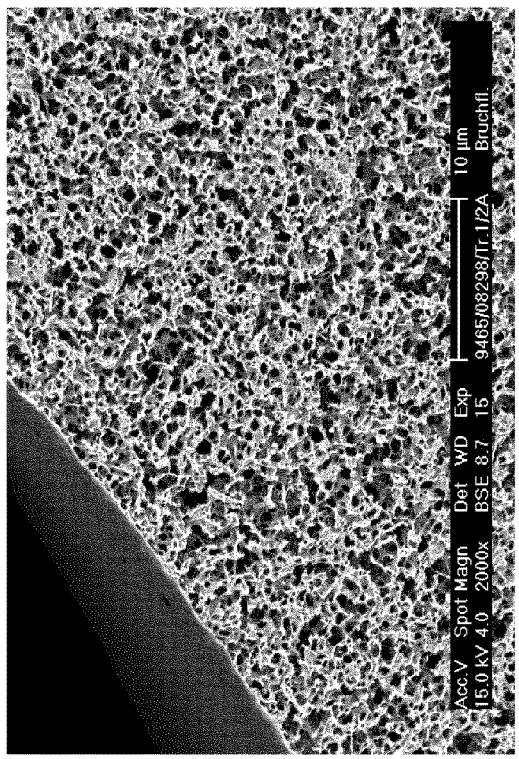

FIG. 8: SEM image of a portion of the cross section of the membrane according to Example 2 at 2000× magnification.

Figure 9:
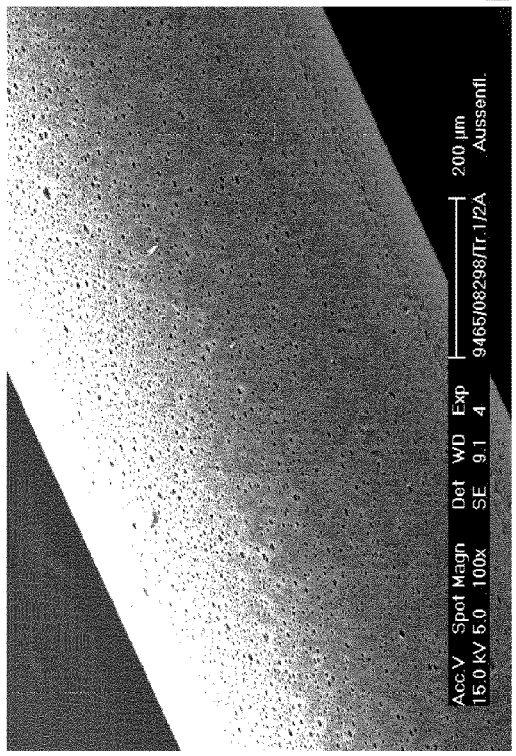

FIG. 9: SEM image of the outer surface of the membrane according to Example 2 at 100× magnification.

Figure 10:
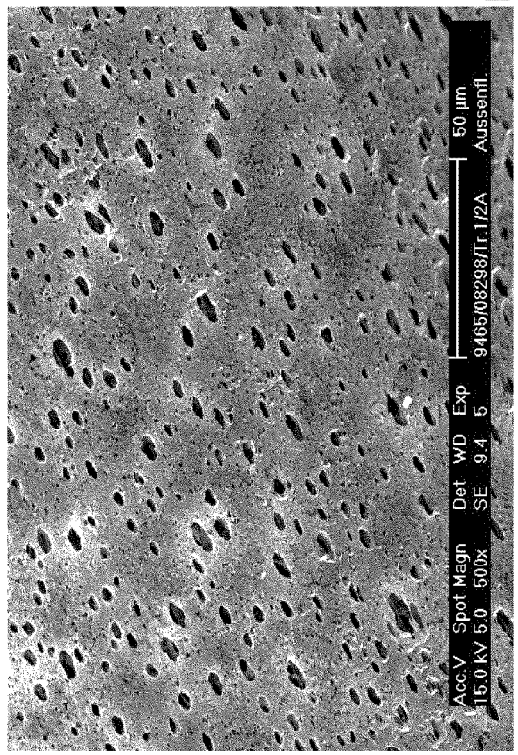

FIG. 10: SEM image of the outer surface of the membrane according to Example 2 at 500× magnification.

Figure 11:
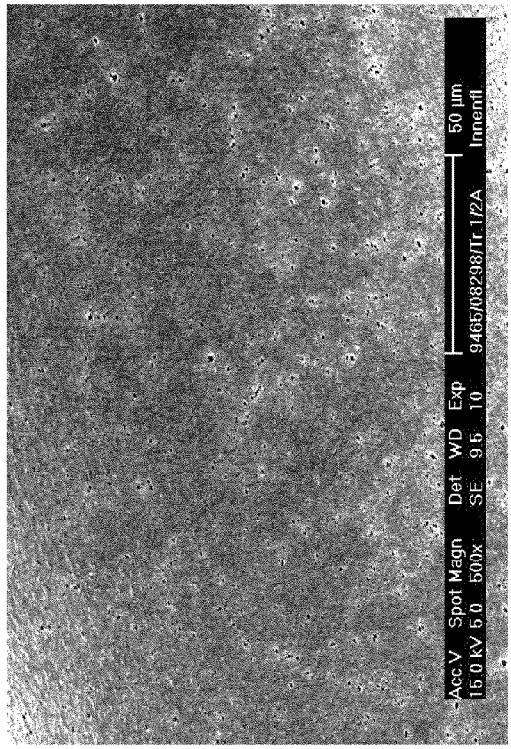

FIG. 11: SEM image of the inner surface of the membrane according to Example 2 at 500× magnification.

Figure 12:
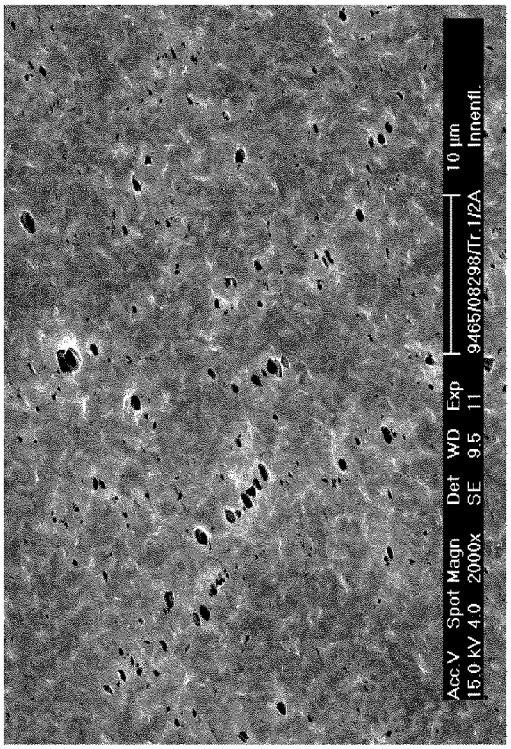

FIG. 12: SEM image of the inner surface of the membrane according to Example 2 at 2000× magnification.

To determine the properties of the inventive hollow-fiber membrane, the following methods were used:

Maximum Separating Pore:

The diameter of the maximum separating pore is determined by means of the bubble point method (ASTM No. 128-99 and F 316-03), for which the method described in DE-A-36 17 724 is suitable. Thereby, $d_{max}$ results from the vapor pressure $P_B$ associated with the bubble point according to the equation $$d_{max} = \sigma_B/P_B$$

where $\sigma_B$ is a constant that is primarily dependent on the wetting liquid used during the measurement. For IPA, $\sigma_B$ is 0.61 μm·bar at 25° C.

Transmembrane Flow for Isopropyl Alcohol (Permeability for IPA):

The hollow-fiber membranes to be tested are used to produce a test cell with a defined hollow-fiber quantity and length. Both ends of the hollow fibers are embedded in a polyurethane resin for this. After curing of the resin, the embeddings are cut to a length of approx. 30 mm, wherein the lumina of the hollow-fiber membranes are opened by the cut. The hollow-fiber lumina in the embeddings must be verified as open. The free length of the hollow-fiber membranes between the embeddings is usually 180+/−10 mm. The number of hollow-fiber membranes is to be selected such that, taking into account the free length and the inside diameter of the hollow-fiber membranes, a filtration surface of approximately 20 cm² in the test cell is provided.

The test cell is incorporated in a testing apparatus and subjected to a flow of isopropyl alcohol (IPA) ultrapure, conditioned to 25° C. at a defined test pressure (approx. 0.2 bar). The filtered IPA volume obtained during a measuring time of 2 min, i.e. the permeate generated during measurement, is determined gravimetrically or volumetrically. Before measurement is begun, the system must be purged of air. In order to determine the TMF, the input and output pressure is measured on the test cell in the testing apparatus. The measurement is performed at 25° C.

The transmembrane flow, TMF, is determined according to formula (III)

$$TMF = \frac{V_W}{\Delta t \cdot A_M \cdot \Delta p} \left[ \frac{ml}{cm^2 \cdot min \cdot bar} \right] \quad \text{(III)}$$

where:
$V_W$=volume of IPA [ml] flowing through the membrane sample during the measuring period
$\Delta t$=measuring time [min]
$A_M$=area of the membrane sample penetrated (normally 20 cm²)
$\Delta p$=pressure set during the measurement [bar]

Transmembrane Flow for Water Vapor:

The measurement of the transmembrane flow for water vapor is performed on a hollow-fiber membrane module with a test surface of 40 cm². Two liquid circuits are connected to this hollow-fiber membrane module, wherein the feed stream (salt water circuit) is connected to the hollow-fiber membrane module in such a way that it flows through the hollow-fiber membranes on the lumen side. The distillate circuit absorbing the permeate flows through the hollow-fiber membrane module in the extracapillary area. The starting volumes of the circuits were each 1.6 l. During measurement, the distillate circuit continuously increases as a result of the added permeate. The salt water circuit has a salt content of 36±0.5 g/l, which is kept constant by conductivity measurement by adding deionized water.

The volume flow in both circuits is set to 200 l/h±5%, wherein the circuits flow counter to the processing direction. The distillate circuit is conditioned to a temperature of 30° C. and the salt water circuit to a temperature of 80° C. Both circuits are kept at the same pressure level, with a pressure of 500 mbar set at the respective inlet to the hollow-fiber membrane module.

In order to determine the transmembrane flow for water vapor, the increase in weight in the distillate circuit is determined gravimetrically over time. The minimum measurement time is at least 15 min.

The transmembrane flow for water vapor in l/(m²·h) is determined as the increase in weight, or the resulting increase in volume per time unit, referred to the current membrane surface (inner surface) of the hollow-fiber membrane module used.

Force and Elongation at Break:

Measuring the breaking force of the hollow-fiber membranes takes place using a standard, universal testing machine from Zwick in Ulm.

The hollow-fiber membrane sample is stretched at a constant speed in the longitudinal direction until it breaks. The force required for this is measured as a function of the change in length and retained in a force/elongation curve. The measurement takes place as multiple determinations on multiple hollow-fiber membrane samples at 100 mm clamping length and at a traction speed of 500 mm/min. The pretension weight is 2.5 cN. The force BK required for break is given as an average numeric value in cN.

The breaking strength $\sigma_B$ of the hollow-fiber membrane sample is obtained by normalizing the breaking force BK to the cross-sectional area $A_Q$ of the membrane wall.

Molecular Weight, Polydispersivity:

The determination of the molecular weight and the mole mass distribution (polydispersivity) takes place using gel permeation chromatography (GPC; columns: PSS GRAM: 10 μm, G, 30, 100, 3000 Å) on polystyrene standards with N-methyl-2-pyrrolidone (NMP)/0.1M LiCl as the eluent, and at a flow rate of 1 ml/min. The sample concentration is 3 mg/ml, and the injection volume is 100 μl (injection system TSP AS 3000). The oven temperature is set to 70° C., and the detection takes place with the Shodex RI 71 differential refractometer. The number average $M_N$ and the weight average $M_W$ of the molar mass distribution are determined from the molar mass distribution using conventional methods. The dispersivity results from the ratio of the weight average $M_W$ to the number average $M_N$, thus $M_W/M_N$.

Pore Size in the Surfaces:

The determination of the average diameter of the pores in the surfaces takes place using image analysis methods based on scanning electron microscope images of the surfaces at 500× magnification (outer surface) or 2000× magnification (inner surface). The scanning electron microscope images of the surfaces were also used to assess the ratio of the longitudinal extension of the pores to the transverse extension thereof.

Volume Porosity:

Samples of at least 0.5 g of the membrane to be examined are dry weighed. In the case of hollow-fiber membranes, 5 samples of the hollow-fiber membrane, each with a length of approximately 20 cm, can be used. The membrane samples are first wetted twice with a liquid that wets but does not cause swelling of the membrane material for 10 min, wherein for hollow-fiber membranes the liquid is also injected into the lumen of the hollow-fiber membranes using a syringe. For the present PVDF membranes, a silicone oil with a viscosity of 200 mPa s at 25° C. (Merck) is used. The samples are subsequently placed in the liquid for 24 hours such that the liquid penetrates into all pores. This is visually discernible in that the membrane samples change from an opaque to a glassy, transparent state. The membrane samples are subsequently removed from the liquid. Liquid adhering to the membrane samples is removed by centrifuging at approx. 1800 g and carefully blown out of the lumen of the hollow-fiber membranes with a weak air stream. The mass of the thus pretreated wet membrane samples, i.e. having liquid-filled pores, is subsequently determined by weighing.

The volume porosity ε is determined according to the following formula:

$$\text{Volume porosity } \varepsilon = \frac{(m_{wet} - m_{dry})/\rho_{liquid}}{(m_{wet} - m_{dry})/\rho_{liquid} + m_{dry}/\rho_{polymer}}$$

where:
$m_{dry}$=weight of the dry membrane sample after wetting and drying [g]
$m_{wet}$=weight of the wet, liquid-filled membrane sample [g]
$\rho_{liquid}$=density of the liquid used [g/cm³]
$\rho_{polymer}$=density of the membrane polymer [g/cm³]

Average Pore Radius ($r_P$)

The determination of the average pore radius of the membranes takes place via the permporometry commonly used for membranes with microporous structure, as described in ASTM F 316-03. For this purpose, the pores of a porous membrane sample are first filled with a liquid of a known interfacial tension. The membrane sample is subsequently impinged with a gas on one side, the pressure of which is increased in stages. With increasing pressure, liquid is forced out of the pores until the gas above the opening pressure begins to flow through the pores of the membrane sample. The opening pressure P for a pore with a defined size depends on the surface tension of the liquid and the pore radius according to Laplace's equation:

$$P = \frac{2 \cdot \gamma \cdot \cos\theta}{r_p},$$

where
$\gamma$=Surface tension of the wetting liquid

θ=Contact angle of the liquid
$r_p$=Pore radius

During measurement, the gas flow through a wetted sample is continuously measured as a function of the applied measuring pressure. Increasing the gas pressure in stages first opens the largest pore and then the smaller pores until all pores in the sample are dry. The total gas flow is determined continuously in the process. In this way, the wet curve is obtained. The measurement is subsequently repeated on the dry sample to obtain the dry curve as a reference curve. Comparing the gas flow values of the wet and dry curves determines the pore size distribution curve.

The average pore radius is determined from the test series for flow measurements, which is performed using a permporometer (capillary flow porometer, PMI, Porous Materials Inc.). A chlorofluorocarbon (Porewick®) having a surface tension of 16 mN/m serves as the wetting reagent. The ends of 6 20 cm long hollow-fiber membrane samples are glued air tight into the holes of a holder such that the lumina of the hollow-fiber samples remain open and can be perfused with gas. After hardening of the glue, the hollow fibers are cut flush where they exit the holder. The free measuring length of the sample pieces is 3 cm in each case. The thus prepared samples are installed in the test chamber of the permporometer with the holder.

The determination of the average pore radius $r_p$ takes place according to the method specified in ASTM F 316-03.

Tortuosity:

The tortuosity of the porous capillary membranes is determined via the gas permeability method according to M. Khayet et al., Polymer, 2002, 43, 3879-3890, Elsevier.

The gas flows for the porous membranes can be described by the pore flow model. Taking into account contributions from diffusion and convection, the permeability (B) of a porous membrane is determined as a function of the measuring pressure, as represented in the following formula (1):

$$B = \frac{3}{4}\left(\frac{2}{\pi MRT}\right)^{0.5} \cdot \frac{r_p \varepsilon}{L_p} + \frac{P_m}{8\mu RT} \cdot \frac{r_p^2 \varepsilon}{L_p} = I_0 + S_0 \cdot P_m \quad (1)$$

where
B=Permeability of the measuring gas through the membrane in mol/(s·m²·Pa)
M=Molecular weight of the measuring gas in (kg/mol)
R=Gas constant =8.314 J/(mol·K)
T=Absolute temperature in (K)
$r_p$=Pore radius of the membrane in (m)
ε=Porosity of the membrane as a fractional amount
$L_p$=Effective pore length of the membrane in (m)
$P_m$=Average measuring pressure in the membrane pores in (Pa)
μ=Dynamic viscosity of the measuring gas in (Pa·s)
$\varepsilon/L_p$=Effective porosity of the membrane in (m$^{-1}$)

If, for different transmembrane pressures, the measured gas permeability B is plotted against the measuring pressures $P_m$, a linear correlation results. The slope $S_0$ and intercept $I_0$ on the B axis can be calculated from the curve. In this way, the effective porosity $\varepsilon/L_p$ can be represented according to the following formula:

$$\frac{\varepsilon}{L_p} = \frac{8\mu RT}{r_p^2} \cdot S_0 \quad (2)$$

The measurement of the gas permeability takes place according to the previously described measuring method for pore size distribution and average pore radius and is realized on dry membrane samples by means of a permporometer (capillary flow porometer, PMI). The membrane samples are inserted in the intended holders. The permeability flows of nitrogen through the membrane samples are measured at different transmembrane pressures at room temperature. With hollow-fiber membranes, nitrogen is applied to the lumen side.

With the porosity ε determined for membrane samples as described previously and the average pore radius $r_P$ determined via the previously described permporometry, the effective porosity $\varepsilon/_P$ can be calculated. For the dynamic viscosity μ of the measuring gas nitrogen, a value of 17.84 Pa·s is taken as a basis.

The tortuosity τ can be calculated as $\tau = L_P/L_{min}$, wherein the thickness of the membrane, which corresponds to the minimum pore length $L_{min}$, is incorporated into the calculation.

EXAMPLE 1

A mixture of PVDF granules of type Hylar 461 and Solef 6020 from Solvay Solexis (mixture ratio 50:50) was melted in an extruder at 235-245° C. The polymer melt was mixed in a mixer with a solvent system consisting of 40 wt. % glyceryl triacetate (component A) and 60 wt. % dioctyl adipate (component B) at 230-245° C. and subsequently processed to form a homogeneous solution. The polymer proportion was set at 26.5 wt. %.

This solution was fed into a hollow-fiber die conditioned to 210° C. and extruded above the phase separation temperature into a hollow fiber. Nitrogen was used as the inner filling. After passing through an air gap, the hollow fiber was fed through an approximately 2 m long spinning tube, which was perfused with a cooling medium conditioned to room temperature. A mixture of glyceryl triacetate and dioctyl adipate in a ratio of 65:35 was used as the cooling medium.

The hollow fiber, solidified as a result of the cooling in the spinning tube, was drawn at a speed of 75 m/min from the spinning tube, wound on a drum, subsequently first extracted using isopropyl alcohol heated to approx. 60° C., and then dried online in a convection oven at approx. 125° C.

The hollow-fiber membranes produced in this way had an outside diameter of 608 μm and a wall thickness of 158 μm. The transmembrane flow for isopropyl alcohol was 3.24 ml/(cm²·min·bar). The breaking strength of the hollow-fiber membrane was 522 cN/mm², and the elongation at break was 80%. The membrane had a bubble point of 1.31 bar, determined by means of the bubble point method with isopropyl alcohol, corresponding to a maximum separating pore of 0.47 μm, and had a transmembrane flow for water vapor of 40 l/(m²·h). The porosity of the hollow-fiber membrane was 78 vol. %, and the average pore diameter was 0.247 μm. The PVDF polymer component forming the membrane structure had a weight-average $M_W$ of the molar mass distribution of 61 800 daltons and a polydispersivity $M_W/M_N$ of 4.43.

With the previously listed data, a tortuosity τ of 1.43 results for the membrane of this example.

As proven by the scanning electronic microscopic (SEM) examination of the fracture plane of the hollow-fiber membrane, this hollow-fiber membrane had a very finely pored structure across its wall (FIG. 1). The SEM image of the entire cross section of the membrane wall at 500× magnification clearly shows a microporous supporting layer, free of finger pores, extending across approximately 85% of the cross-section, with a sponge-like, open-pored pore structure that is substantially isotropic across the wall thickness, wherein the pores in this supporting layer have on average a size less than 1 µm (FIG. 2).

SEM images of the outer surface of the membrane at 100× magnification show a uniform and relatively even structure of the surface, which has island-shaped pores with a slightly elongated shape (FIGS. 3, 4). A comparison of FIG. 2 with FIG. 4 shows that the pores of the hollow-fiber membrane in the outer surface are larger than the pores in the area of the supporting layer with an isotropic pore structure. In comparison with the outer surface, the pores in the inner surface are significantly smaller (FIGS. 5, 6).

EXAMPLE 2

The procedure was the same as in Example 1. Deviating from Example 1, the polymer proportion was set at 26.3 wt. %. Nitrogen was used as the inner filling.

The hollow-fiber membrane had an outside diameter of 654 µm and a wall thickness of 141 µm. The transmembrane flow for isopropyl alcohol was 5.87 ml/(cm$^2$·min·bar). The breaking strength of the hollow-fiber membrane was 471 N/mm$^2$, and the elongation at break was 97%. The membrane had a bubble point of 1.31 bar, determined by means of the bubble point method with isopropyl alcohol, corresponding to a maximum separating pore of 0.47 µm, and had a transmembrane flow for water vapor of 56 l/(m$^2$·h). The porosity of the hollow-fiber membrane was 81 vol. %, and the average pore diameter was 0.274 µm. The PVDF polymer component forming the membrane structure had, as in Example 1, a weight-average $M_W$ of the molar mass distribution of 61 800 daltons and a polydispersivity $M_W/M_N$ of 4.43.

With the previously listed data, a tortuosity τ of 1.27 results for the membrane of this example.

As proven by the scanning electronic microscopic (SEM) examination of the fracture plane of the hollow-fiber membrane, this hollow-fiber membrane had a very finely pored structure across its wall (FIG. 7). The SEM image of the entire cross section of the membrane wall at 500× magnification clearly shows a microporous supporting layer, free of finger pores, extending across approximately 85% of the cross-section, with a sponge-like, open-pored pore structure that is substantially isotropic across the wall thickness, wherein the pores in this supporting layer have on average a size less than 1 µm (FIG. 8).

SEM images of the outer surface of the membrane at 100× magnification show a uniform and relatively even structure of the surface, which has island-shaped pores with a slightly elongated shape (FIGS. 9, 10). A comparison of FIG. 7 with FIG. 10 shows that the pores of the hollow-fiber membrane in the outer surface are larger than the pores in the area of the supporting layer with an isotropic pore structure. In comparison with the outer surface, the pores in the inner surface are significantly smaller (FIGS. 11, 12).

COMPARATIVE EXAMPLE 1

The procedure was the same as in Example 1. Deviating from Example 1, the PVDF granules of type Solef 1015 from Solvay Solexis with a weight-average $M_W$ of the molar mass distribution of 513 000 daltons and a polydispersivity $M_W/M_N$ of 5.52 were used as the polymer component. The polymer melt was mixed in a mixer with a solvent system consisting of 35 wt. % glyceryl triacetate (component A) and 65 wt. % dioctyl adipate (component B) at 230-245° C. and subsequently processed to form a homogeneous solution. The polymer proportion was set at 27.1 wt. %. Nitrogen was used as the inner filling. The polymer solution was spun at 235° C.

The resulting hollow-fiber membrane had an outside diameter of 619 µm and a wall thickness of 136 µm. The transmembrane flow for isopropyl alcohol was 1.70 ml/(cm$^2$·min·bar). The breaking strength of the hollow-fiber membrane was 358 cN/mm$^2$, and the elongation at break was 45%. The membrane had a bubble point of 1.10 bar, determined by means of the bubble point method with isopropyl alcohol, corresponding to a maximum separating pore of 0.55 µm, and had a transmembrane flow for water vapor of 32 l/(m$^2$·h). The porosity of the hollow-fiber membrane was 81 vol. %, and the average pore diameter was 0.199 µm.

With the previously listed data, a tortuosity τ of 1.62 results for the membrane of this comparative example.

COMPARATIVE EXAMPLE 2

The procedure was the same as in Comparative example 1. Deviating from Comparative example 1, a solvent system consisting of 26 wt. % glyceryl triacetate, 67.5 wt. % dioctyl adipate, and 6.5 wt. % ε-caprolactam was used, with which the polymer component was mixed and subsequently a homogenous solution produced at 230-245° C. The polymer proportion was set at 30.6 wt. %. Nitrogen served as the inner filling. The polymer solution was spun at 200° C. A mixture of glyceryl triacetate and castor oil in a ratio of 70:30 was used as the cooling medium.

The obtained hollow-fiber membrane had an outside diameter of 560 µm and a wall thickness of 133 µm. The transmembrane flow for isopropyl alcohol was 2.62 ml/(cm$^2$·min·bar). The breaking strength of the hollow-fiber membrane was 415 cN/mm$^2$, the elongation at break was 45.3%. The membrane had a bubble point of 1.30 bar, determined by means of the bubble point method with isopropyl alcohol, corresponding to a maximum separating pore of 0.47 µm, and had a transmembrane flow for water vapor of 30 l/(m$^2$·h).

COMPARATIVE EXAMPLE 3

The procedure was the same as in Comparative example 1. Deviating from Comparative example 1, a solvent system consisting of glyceryl triacetate and dioctyl adipate in a ratio of 50:50 was used. The polymer proportion was set at 27 wt. %. Nitrogen served as the inner filling. The polymer solution was spun at 225° C. As in Comparative example 2, a mixture of glyceryl triacetate and castor oil in a ratio of 70:30 was used as the cooling medium.

The obtained hollow-fiber membrane had an outside diameter of 549 µm and a wall thickness of 132 µm. The transmembrane flow for isopropyl alcohol was 0.31 ml/(cm$^2$·min·bar). The membrane had a bubble point of 1.55 bar, determined by means of the bubble point method with isopropyl alcohol, corresponding to a maximum separating pore of 0.395 µm, and had a transmembrane flow for water vapor of 8 l/(m$^2$·h).

The invention claimed is:
1. Hydrophobic hollow-fiber membrane made from a vinylidene fluoride polymer, wherein the hollow-fiber membrane has a wall with a wall thickness, an outer surface on its outer side and an inner surface on its inner side and facing its lumen, wherein the hollow-fiber membrane has a continuous skin on its inner surface and a continuous skin on its outer surface, wherein pores are formed in the skin of the inner surface and in the skin of the outer surface, and wherein the hollow-fiber membrane, adjacent to the skin of the inner surface, has a supporting layer having a microporous, sponge-like, open-pored structure that is substantially isotropic across the wall thickness, the supporting layer extending over at least 80% of the wall thickness and comprising pores having an average diameter of less than 1 μm, and wherein the vinylidene fluoride polymer forming the structure of the hollow-fiber membrane has a weight-average molecular weight Mw in the range from 550 000 to 700 000 daltons and a polydispersivity, given by the ratio of the weight average $M_W$ and the number average $M_N$ of the molecular weight, from 3 to 7, the pores in the skin of the outer surface and the pores in the skin of the inner surface have a closed perimeter in a plane of the skin, and the pores in the skin of the outer or the inner surface have a ratio of their longitudinal extension in the direction of the longitudinal axis of the hollow-fiber membrane to their transverse extension in the circumferential direction of the hollow-fiber membrane of a maximum of 10, the porosity of the hollow-fiber membrane lies in the range from 50 to 90 vol. %, the wall thickness in the range from 50 to 300 μm, and the diameter of the lumen in the range from 100 to 500 μm, a transmembrane flow for isopropyl alcohol in the range from 2 to 8 ml/(cm²·min·bar), the hollow-fiber membrane has a maximum separating pore diameter $d_{max}$ in the range from 0.3 to 0.7 μm, determined according to a bubble point test method DE-A-36 17 724; and the pores in the skin of the inner surface are smaller than the pores of the skin of the outer surface and the pores in the skin of the outer surface are larger than the pores in the supporting layer.

2. Hollow-fiber membrane according to claim 1 comprising a transmembrane flow for water vapor of at least 35 l/(m²·h), determined by means of a module of the hollow-fiber membrane with a membrane area of 40 cm² at a salt water circuit temperature of 80° C. and a distillate circuit temperature of 30° C., a volume flow in the circuits of 200 l/h, a pressure level in the circuits of 500 mbar at the inlet to the hollow-fiber membrane module, and a salt concentration in the salt circuit of 36 g/l.

3. Hollow-fiber membrane according to claim 1 wherein the hollow fiber membrane has an elongation at break of at least 50%.

4. Hollow-fiber membrane according to claim 1 wherein the hollow fiber membrane has a breaking strength of at least 400 cN/mm².

5. Hollow-fiber membrane according to claim 1 wherein the hollow fiber membrane has a volume porosity in the range from 70 to 85 vol. %.

6. Hollow-fiber membrane according to claim 1 wherein the hollow fiber membrane has a maximum pore tortuosity of 1.5.

* * * * *

UNITED STATES PATENT AND TRADEMARK OFFICE
CERTIFICATE OF CORRECTION

PATENT NO. : 10,946,345 B2
APPLICATION NO. : 14/893274
DATED : March 16, 2021
INVENTOR(S) : Oliver Schuster It is certified that error appears in the above-identified patent and that said Letters Patent is hereby corrected as shown below:

On the Title Page

Item [71], Applicant, delete "MEMBRANA GMBH, Wuppertal (DE)" and insert -- 3M INNOVATIVE PROPERTIES COMPANY, St. Paul, MN (US) --, therefor.

Item [73], Assignee, delete "EM" and insert -- 3M --, therefor.

In the Specification

Column 12,
Line 1, delete "c-caprolactam," and insert -- ε-caprolactam, --, therefor.
Line 3, delete "c-caprolactam" and insert -- ε-caprolactam --, therefor.

Column 18,
Line 14, delete "ε/$p$" and insert -- ε/L$p$ --, therefor.

In the Claims

Column 21,
Line 16 (approx.), in Claim 1, delete "Mw" and insert -- $M_w$ --, therefor.

Signed and Sealed this
Twenty-first Day of February, 2023

Katherine Kelly Vidal
*Director of the United States Patent and Trademark Office*